(12) United States Patent
Brook-Levinson et al.

(10) Patent No.: US 6,596,960 B1
(45) Date of Patent: Jul. 22, 2003

(54) ELECTRICAL HEATING ELEMENTS AND METHOD FOR PRODUCING SAME

(75) Inventors: Edward Brook-Levinson, Petach Tikva (IL); Vladimir Manov, Haifa (IL); Yosef Margolin, Haifa (IL); Eliezer Adar, Sde Varburg (IL); Yevgeny Sorkine, Ramat Aviv (IL); Vadim Volchkov, Vladimir (RU)

(73) Assignee: Advanced Heating Technologies Ltd., Even Yehuda (IL)

( * ) Notice: Subject to any disclaimer, the term of this patent is extended or adjusted under 35 U.S.C. 154(b) by 0 days.

(21) Appl. No.: 09/063,884

(22) Filed: Apr. 22, 1998

(30) Foreign Application Priority Data

Dec. 7, 1997 (IL) .................................................. 122476

(51) Int. Cl.⁷ .............................................. B23K 10/00
(52) U.S. Cl. ................... 219/121.47; 427/451; 428/336
(58) Field of Search .................. 219/121.47, 121 P, 219/553, 523, 121.59, 543, 548, 525, 385; 427/37, 34, 451; 164/80; 429/152; 338/308, 309, 314; 204/247.3; 428/570, 336

(56) References Cited

U.S. PATENT DOCUMENTS

| | | | | |
|---|---|---|---|---|
| 3,349,722 A | * | 10/1967 | Davis | 104/279 |
| 3,505,498 A | * | 4/1970 | Shevlin | 219/385 |
| 3,737,624 A | * | 6/1973 | Eilenberger | 219/525 |
| 4,286,251 A | * | 8/1981 | Howell | 338/309 |
| 4,503,085 A | * | 3/1985 | Dickson et al. | 427/451 |
| 4,763,158 A | * | 8/1988 | Schlueter | 399/324 |
| 4,966,626 A | * | 10/1990 | Fujiki et al. | 75/238 |
| 5,016,610 A | * | 5/1991 | Meguro et al. | 126/91 A |
| 5,017,525 A | * | 5/1991 | Birchall et al. | 501/87 |
| 5,049,450 A | * | 9/1991 | Dorfman et al. | 428/570 |
| 5,122,777 A | * | 6/1992 | Shiratsuki et al. | 338/306 |
| 5,189,284 A | * | 2/1993 | Takahashi et al. | 219/543 |
| 5,227,231 A | * | 7/1993 | Yoshizaki et al. | 428/336 |
| 5,389,464 A | * | 2/1995 | Specht | 429/152 |
| 5,527,442 A | * | 6/1996 | Sekhar et al. | 204/247.3 |
| 5,593,518 A | * | 1/1997 | Ramanan | 148/304 |
| 5,665,262 A | * | 9/1997 | Hajaligol et al. | 219/553 |
| 5,850,072 A | * | 12/1998 | Eckert | 219/523 |
| 5,935,461 A | * | 8/1999 | Witherspoon et al. | 219/121.59 |

* cited by examiner

Primary Examiner—Teresa Walberg
Assistant Examiner—Quang Van
(74) Attorney, Agent, or Firm—Morrison & Foerster LLP (57) ABSTRACT

A method for the production of a heater element on a target area. A plurality of particles having a specified size range are prepared. The plurality of particles include a metallic alloy, and the metallic alloy includes boron. The particles are applied to the target area using at least one of a plasma spray process and a flame spray process.

29 Claims, 5 Drawing Sheets

ELECTRICAL HEATING ELEMENTS AND METHOD FOR PRODUCING SAME

FIELD OF THE INVENTION

The present invention relates to metallic alloys, and more particularly to alloys including boron and produced using a plasma or flame spray process.

BACKGROUND OF THE INVENTION

Heretofore, electrical heating elements have had relatively low specific electrical resistances. This has resulted in relatively high cost and lower reliability of heaters.

Using conventional heater materials like NiCr or Kanthal, a high resistance may be achieved in a small volume by using fine wire. A thin wire allows the use of a relatively short wire to achieve the desired electrical resistance. This achieves a small volume heater and also saves material. A problem with this approach, however, is how to transfer the heat developed in the wire to the ambient. Wires have a small surface area, because of their circular cross-section. This results in a relatively high thermal resistance. Thermal resistance may be defined as the ratio of the temperature difference developed across a piece of material, to the thermal power being transferred through that piece. Thus, lower thermal resistance is the capability to transfer more heat energy, while developing a smaller temperature differential.

Systems now in use, including small heaters with fine wires and having a high thermal resistance, are used to deliver relatively high electrical power.

The above structure results in a high temperature differential, that is, the heater wires are very hot, for example about 600–700EC.

A disadvantage of this structure is that expensive wire materials and isolators are used, which are capable of operating at these elevated temperatures.

Another disadvantage is the lower reliability of the heater element, resulting both from high operating temperature (where oxidation is accelerated) and the fine structure of the heater wire (only a small defect in a thin wire can bring immediate local overheating and damage to the heater). Minor imperfections in the heater ribbon may result in local overheating and/or the interruption of the electrical current.

Another approach to heater design is to use amorphous ribbons. It is difficult, with amorphous ribbons, to achieve a heater with small dimensions, since the specific resistivity of the usable metals is relatively low, and the cross section has to be larger than a minimum value. Therefore, the relatively high value of the desired resistance is achieved by using a longer ribbon. Lower operating temperatures may be used, because of the large surface area of these heaters, with corresponding low thermal resistance.

The heater element, however, may not be made in a small size if a relatively high power is required. Moreover, these heaters require means to attach to a substrate, both for mechanical support and to achieve low thermal resistance to that substrate, to deliver the heat developed therein. Amorphous heaters must be operated at a low temperature, less the embrittlement or crystallization temperature is reached, where the amorphous heater material irreversibly changes its structure to become crystalline, the electrical resistance decreases, and the heater may be damaged.

It would be advantageous to make a small heater structure, that is, a heater with small dimensions. It is more convenient to have a small heater, to save space in the house. Smaller size reduces cost. It also saves raw materials, when one considers the huge market for heating devices.

Smaller size devices, when reduced to waste, have a less detrimental effect on the ecology, since far smaller quantities of waste are produced.

Moreover, existing heaters have a rather complex structure, requiring corresponding complex production methods.

For example, in heating pipes the structure may include an insulator, together with a heater element and with mechanical means to attach the heater to pipe, etc. This is a costly structure and process.

Electrical heaters are used in a wide variety of applications, like domestic heating, industrial/chemical processes, and much more. Thus the importance of low cost, small and reliable electrical heaters is evident.

SUMMARY OF THE INVENTION

In accordance with the present invention, these and other objectives are achieved by providing a heater element fabricated by particle deposition using a plasma or flame spray method.

According to one aspect of the present invention, in a preferred embodiment, small particles of a metallic alloy are deposited onto an isolating surface using a plasma or flame spray process. The high temperature of the plasma results in the melting of the particles, so the particles reach the insulating surface in liquid state. The particles splash on the solid surface and solidify, thus forming a metallic layer.

According to a second aspect of the present invention, in a preferred embodiment, the metallic alloy includes boron, so that the liquid particles in the plasma are coated with oxides, with boron oxide being the predominant component. Apparently, during the spray process the structure of the particles is changed—whereas the solid particles have a homogeneous structure, in the liquid globules the boron mostly moves to the outside surface, and the globules become coated with oxides.

According to a third aspect of the present invention, in a preferred embodiment, the liquid particles are deposited on an insulating layer, for example alumina. Good thermal conductivity is achieved, with low temperature differential between heater and the ambient.

According to a fourth aspect of the present invention, in a preferred embodiment, the isolating layer is deposited using a plasma or flame spray process, prior to depositing the metallic alloy particles.

According to a fifth aspect of the present invention, in a preferred embodiment, the isolating layer includes alumina particles. The heater element is impregnated, for example with a silicon organic compound, to close the pores of the isolator.

According to a sixth aspect of the present invention, in a preferred embodiment, the isolating layer includes a protective coating layer using enamel.

According to a seventh aspect of the present invention, in a preferred embodiment, an abrasive with improved mechanical hardness may be obtained by the application of particles of a boron-including alloy, using a plasma or flame spray method.

Further objects, advantages and other features of the present invention will become apparent to those skilled in the art upon reading the disclosures set forth hereinafter.

BRIEF DESCRIPTION OF THE DRAWINGS

A detailed description of a preferred embodiment of the present invention will be made with reference to the accompanying drawings.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
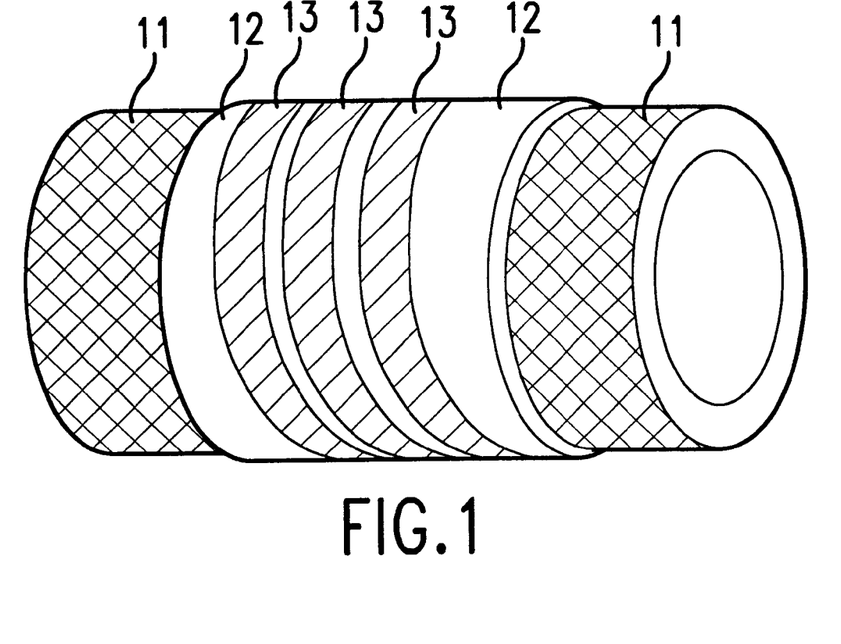
FIG. 1 illustrates an example of a pipe with a heater element made of alloys including boron and produced using a plasma or flame spray process.

FIG. 1 illustrates an example of a pipe 11 with a heater element 13 made according to a preferred embodiment of the present invention.

The pipe 11 may be used for liquids or gases, and is preferably metallic. Metallic pipes are preferred because of their superior resistance to high temperatures and high pressure, and their nonporous structure, suitable for transferring of liquids and gasses.

An isolating layer 12 is deposited on the pipe, in the area where the electrical heater 13 is to be deposited in a subsequent stage. The isolating layer 12 transfers the heat from heater element 13 to pipe 11, while at the same time acting to isolate the adjacent windings of heater element 13 from the electrically conductive pipe 11.

Heating element 13 is implemented as windings deposited on isolating layer 12. Electrical current thus flows in a helical or spiral path around pipe 11, so that thermal energy is generated in element 13 to heat the pipe 11.

Thus, a liquid or gas flowing in pipe 11 will be heated with the heater having the above-detailed structure, while electrical current flows through heater element 13.

Although the above description refers to a heated pipe, where a heater element 13 is deposited in a helical path around a pipe, an electrical heater may be deposited on other targets, either circular or planar or having other shapes.

Examples of embodiments of the invention for a blower and a heated pot are illustrated below with reference to FIGS. 4 and 5, respectively.

The above method may be used with any heated device. In the present invention, in a preferred embodiment, the heating element 13 is produced using a novel method, that is, using a plasma spray. Moreover, the method includes the application of small particles, of controlled size, made of a boron-containing alloy.

The combination of plasma spray and boron-including particles results in a special structure of heater 13, having high electrical specific resistance. This enables the use of a small heater to apply a high power, for example more than 1 kWatt, to heat water for example using a small section of heated pipe.

The structure is special as a result of the spraying method, using particles of an alloy including a small percentage of boron.

In a preferred embodiment, the isolating layer is made of alumina, which may be applied using the same plasma spray process. Alumina is preferred because of its good thermal conductivity and good electrical isolation properties.

There are many applications to heated pipes. One application is to heat water, for example in showers. Immediate hot water on demand may be supplied, that is water is heated only when required.

Another application is domestic heating. Water is heated in a pipe, then radiator means are used to deliver the heat to the room. Hot pipes may also be used in industry, in chemical processes and much more.

A coating with the method detailed below can be used for other purposes, apart from heating. For example, it was found that the deposited layer has good mechanical hardness. The coated surface may be used as an abrasive.

Figure 2:
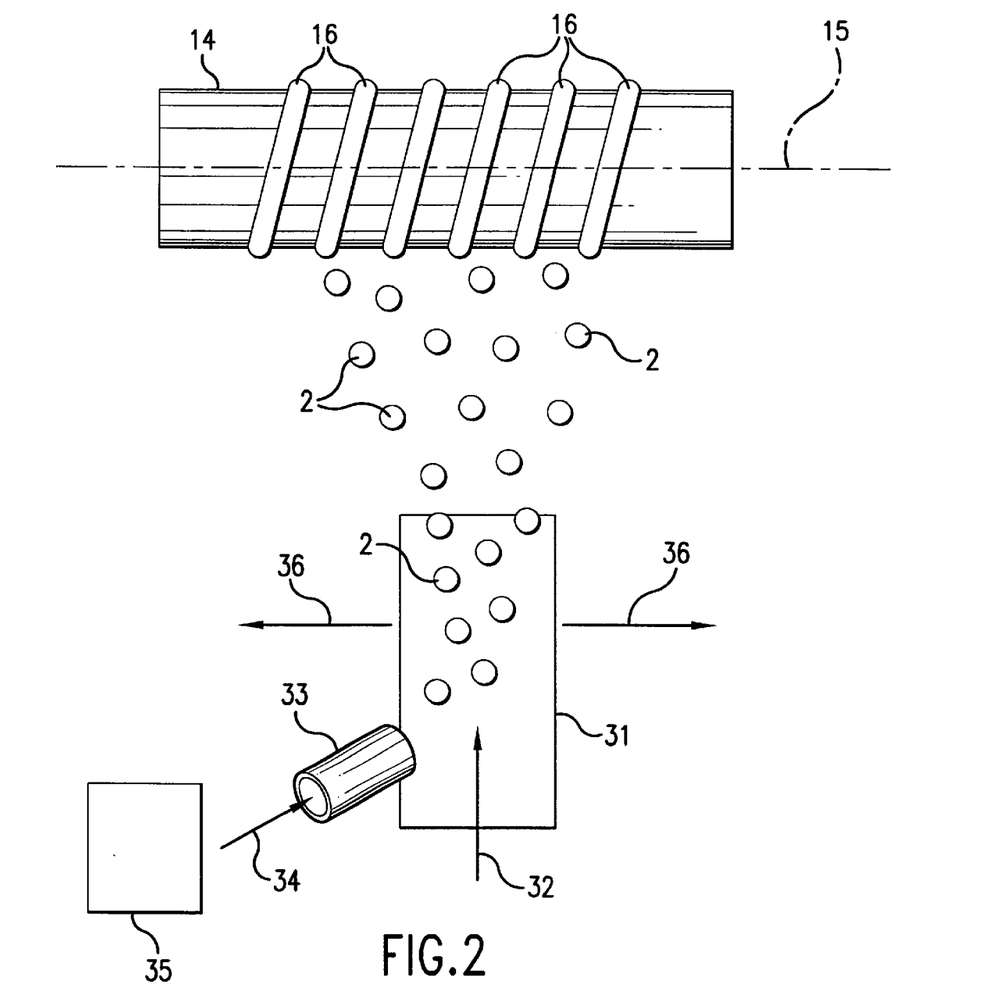
FIG. 2 illustrates an example of a method for applying the heater element using plasma or flame spray.

FIG. 2 illustrates an example of a method and system for plasma spray coating, to deposit the metallic heater element.

Prior to the application of the heater element, the pipe 11 is coated with an isolating layer 12, using a method known in the art.

For example, plasma spray may be used to coat pipe 11 with alumina particles, which adhere to the pipe 11 and to each other to form an isolating layer. Alumina melts at 2,100 E Celsius, thus may be applied in liquid state using a plasma spray method.

This is a low cost and effective method.

According to the present invention, in a preferred embodiment, it was found that the alumina layer, produced as detailed above, has a porous structure which absorbs humidity to create an electrical leakage effect. This may be undesirable and even dangerous. The leakage current activates protection fuses, and is a very inconvenient side effect. Otherwise, humidity may act as an electrolyte, to cause a breakthrough of the isolator and a short circuit between heater element and the metallic pipe.

The problem was solved by impregnating the alumina layer with an isolating compound. In one embodiment, the method of impregnation was as follows:

A. An alumina insulating layer was formed on a metallic pipe or other target surface.

B. The heater element was spray-deposited on the insulating layer.

C. An impregnating solution was prepared comprising a silicon organic compound or glue, diluted with a suitable solvent like Toluene. The solvent increases the capability of the solution to penetrate the pores of alumina.

D. The whole device, including the target surface with alumina and heater element, was immersed in the impregnating solution prepared in step C for a time period of 30 minutes or more.

E. The device was left to dry out in fresh air at room temperature, until the Toluene evaporated.

F. The device was left to dry in a dry furnace at a temperature of about 200EC for about 30 minutes.

It was found that the silicon compound is easily absorbed within the pores of the alumina layer, and the pores are effectively closed. The silicon compound can withstand a temperature of about 400 E C.

This is an effective solution for the present application, since the isolator need not withstand high temperatures. For water heating, for example, the temperature is below 100EC, thus a low temperature impregnating material can be used.

The system uses target 14 for plasma spray, here a pipe coated with an insulator. During the coating process, the coated pipe 14 is rotated about its axis of symmetry 15, so that a uniform spray is applied to the whole perimeter, or external surface, of pipe 14.

A mask 16 for plasma spray is used to create separate windings on pipe 14. Here the mask 16 is implemented as a strip wound around pipe 14. A wire of textile was successfully used in one embodiment of the present method.

Globules of metallic alloy 2 are generated in plasma nozzle 31, by the action of hot plasma stream 32 on metallic particles 34 inserted into tube 33. The tube 33 is used for injecting metallic particles, in solid state, into tube 31 from weigher 35.

It was found that, in liquid particles of an alloy including boron, the boron tends to move to the surface of the liquid. This is used in the present invention, in a preferred embodiment, where the boron reaches the surface of the liquid globules 2, and becomes oxidized.

Thus, it is believed that globules 2 reaching pipe 14 are coated with an oxide layer, which is an electrical isolator. After the solidification of globules 2 on the surface of pipe 14, there are formed small contact points between the globules. These points form a multitude of tiny paths, or bridge contacts, with direct electrical contact between the metallic inside part of the globules, so that electrical current may pass through these contact points.

It is believed that the high specific electrical resistance achieved with the above-detailed method is a result of the structure thus formed.

Overall, this results in a structure with much higher electrical specific density, relative to conventional heater elements using solid metallic layers, wires or ribbons.

The specific resistance measured for a layer applied using the novel method was in the range 700 to 1200 microOhm*cm.

For comparison, the specific resistance of presently used materials is much lower.

For example, the specific resistance for other materials is:

NiCr—112microOhm*cm

Amorphous ribbons—140 to 160 microOhm*cm

Kanthal—140 microOhm*cm

Very thin resistive layers may be deposited on the substrate, for example of a thickness of about 30 microns. Thus, high electrical resistance may be achieved in a small volume.

The structure achieved with spraying has very good thermal conductivity, resulting from both the excellent adhesion of the heater to the substrate, and the good thermal conductance of the substrate. It is known that alumina has very low thermal resistivity. The particles forming the heater element are directly attached to the alumina, without any intervening means like adhesives, so good heat transfer is achieved.

This allows the heater to operate at lower temperatures than prior art heaters, to achieve effective heat transfer and increase the reliability of the heater.

In one embodiment of the invention, a heated pipe of length 35 cm was produced and was successfully used to heat water, by the application of about 3.0 kWatt of electrical power.

The performance of the heater system is impressive—a sustained heat delivery of 20 Watt/cm$^2$ was achieved. This is the specific heat release, or heat power delivered per unit area of heater element. Thus, a heater with dimensions of 10 by 10 cm may provide a heat power of 2 kWatt.

The above was measured with stable operation, that is no noticeable deterioration with time. At a higher power of 30 Watt/Cm$^2$ the performance was not stable, but the heater burned after some time.

The following is a description of a preferred method of heater production.

A. Prepare particles of an alloy including boron, for example FeSiB, and where the particles are within a predefined size range. It was found that a specific, controlled size range results in better heater performance, possibly because of the more uniform structure of the heater element thus formed.

B. Plasma or flame spray with the particles produced in step (A), on a target including an insulating layer. The target may comprise, for example, a pipe or other shaped substrate where the heater is to be applied thereto.

It is important that the plasma or flame include oxygen, to allow the formation of a boron oxide layer on the surface of the liquid globules in the spray.

The coating process is continued until the desired total electrical resistance is achieved. The resistance corresponds to the desired electrical power to be applied when connected to electrical mains.

The coating process includes the application of the spray with boron-containing alloy particles, while rotating the pipe or target and moving the spray device laterally, to achieve a uniform coating of the target.

It was found that a heater element produced using the above method can operate at 600 E C without oxidation, for prolonged periods.

If the target is a conductive (metallic) surface, then an insulating layer may be applied thereto prior to step (B) above. Possible coating methods with alumina or enamel are detailed below.

The surface of the target may be prepared prior to the application of insulator and heater element. A preferred embodiment of a surface preparation method is detailed below.

Various methods may be used to produce the boron-including particles, to be used in the spray application as detailed above.

The particles may be of an amorphous or microcrystalline material, and using various base metals. The following is an example of a preferred embodiment of a method for the preparation of particles of an amorphous alloy.

A. Prepare master alloy, of an alloy including boron, for example FeSiB.

B. Produce a metallic ribbon using a melt-spinning method.

C. Anneal the ribbon to achieve an embrittled ribbon.

D. Mill the ribbon to produce small particles. The milling is easier to perform on a brittle ribbon.

E. Classify particles by size, to achieve a specific, controlled size range as desired.

The following is an example of a preferred embodiment of a method for the preparation of microcrystalline particles.

A. Prepare master alloy, of an alloy including boron, for example FeSiB

B. Reduce the alloy to particles, for example by atomizing. A possible method is spray from melt into water.

C. Classify particles by size, to achieve particles of a specific, controlled size range as desired.

The following is an example of a preferred embodiment of a spraying method.

Various mechanical arrangements may be utilized to perform the spraying process, using for example both a rotation and lateral displacement of the pipe/target, or only a two-plane displacement of the plasma nozzle.

What is important in the above embodiments is to spray it uniformly, to achieve a uniform layer of heater element, that is a layer having a constant thickness and specific electrical resistivity. This is important to achieve uniform heating when electrical power is applied.

If there are nonuniform locations, that will result in local overheating and to the destruction of the heater element at high power. Thus, uniformity of the deposited heater is important toward achieving a reliable heater, which is capable of prolonged operation at high power.

The desired uniformity of the deposited layer may be achieved by controlling the spraying parameters, for example including:

A. Using a spray mechanism (not shown) which scans the target area at a constant rate. Various mechanisms may be implemented which control the relative movement between spraying nozzle and target, to implement a scan at a constant rate of scanned area/unit time.

B. Controlling the size of the particles in the spray. To achieve that, a method of selecting the particles may be applied, so that only particles in a specific size range are used. It was found that preferred particle sizes range between about 5 and 150 micrometer. In another embodiment, still better performance was obtained with particles in the range of 60 to 90 micrometers. In another embodiment, the preferred particle size was that which resulted in liquid globules of diameter range about 5 to 300 micron.

C. Controlling the rate of delivery of particles into the plasma or flame. In tests performed at AMT Ltd., a mechanism known as a "weigher" was used, to deliver particles at a constant, preset rate. This ensures that a constant mass of particles is applied per second.

Various embodiments may be used to implement the above method. What is important is to apply an equal quantity of deposited material to each part of the target, that is a uniform density is achieved. Density here refers to mass of deposited material per unit area of target, for example per square cm.

For plasma deposition of alumina, the same considerations apply. It is highly desirable to achieve a uniform coating, of equal thickness.

To achieve a 3 kWatt heater, only about 40 gram of alloy is required. Only about 15 gram are deposited on target, the rest is wasted in the process. Still, the quantity of material used is very small. This is a very cost-effective method for producing heaters.

In another embodiment of the method, flame spray was used instead of the plasma spray, with good results. Again, it is important that the flame include oxygen, to allow the formation of a boron oxide layer on the surface of the globules in the spray.

Plasma spray is preferred to flame, since it resulted in superior performance.

A possible reason may be the higher velocity of plasma. With plasma spray, the globules hit the target at higher velocity and achieve a more dense structure of the layer there. This results in a higher performance heater element.

Plasma also has a higher temperature than flame, about 5,000 versus 3,500 E Celsius, respectively. Thus, plasma achieves better adhesion to substrate and better heater reliability.

In specific embodiments of the invention, boron-containing alloys were used, for example:

a. FeCrB b. FeBSiCuNb

Other alloys which were found usable for plasma spray or flame spray include the following, expressed in percent relative quantities (weight %):

1. C=0.03, Ni=1.52, Si=5.12, B=3.08, Fe=90.22, P=0.015, S=0.015

2. Nb=5.6, Si=7.7, Fe=84.1, B=1.3, Cu32 1.3

3. Cr=16.0, Si=4.2, Ni=1.13, 13=2.3, Fe32 75.8, C=0.034, 5=0.017, P=0.017

4. Cr=10, Si=4.2, N=1.13, 13=2.3, Fe32 81.8, C=0.034, 5=0.017, P=0.017

5. Fe=89, Cr=16, B=3.3, Sn<0.1, Pb<0.1

It was found that in these alloys, although boron represents but a small percentage of the alloy, it is the boron which helps achieve the high electrical resistance of the deposited layer. This may be achieved because of the tendency of boron to move to the outer surface of the liquid drops.

The above described method is suitable for applying an electrical heater element to a wide variety of substrates, having various forms, for example pipes, planar surfaces and much more.

Heater elements may be deposited on metallic surfaces or isolating surfaces like ceramics.

To form a heater or a metallic surface, an insulating layer must be first applied, to isolate the heater from the metallic surface. One possible insulator is alumina. Alumina may be deposited using a plasma spray as detailed above, or using other methods.

In another embodiment, the insulator is enamel. A layer of enamel coating is applied to a metallic surface using methods known in the art.

In another embodiment, a plurality of enamel layers are applied. The heater element is then deposited by spraying on the insulator layer.

For applications in the chemical industry, where heated pipes may be used to transfer active chemicals like acids, the inside of the pipe may be coated with a protective layer, for example using enamel coating.

The enamel inside coating layer then protects the pipe from the chemicals.

The pipes may be made of metals as known in the art, like iron, steel or copper.

The surface of the target may be prepared prior to the application of insulator and heater element, to ensure better adhesion of insulator and heater element to the pipe or other target. One example of a preferred embodiment of a surface preparation method is detailed below.

A. Blasting to remove dirt and undesired materials from the target surface.

B. Application of a thin layer of metal using plasma or flame spray. A very thin layer is applied, of thickness of about 1 or 2 or 5 micron for example. The subsurface layer is usually no more than 10 micron thick. A thin layer may be applied, for example, using a high lateral speed. This is called a "virgin surface" usable for the subsequent application of insulator and heater layers.

Figure 3:
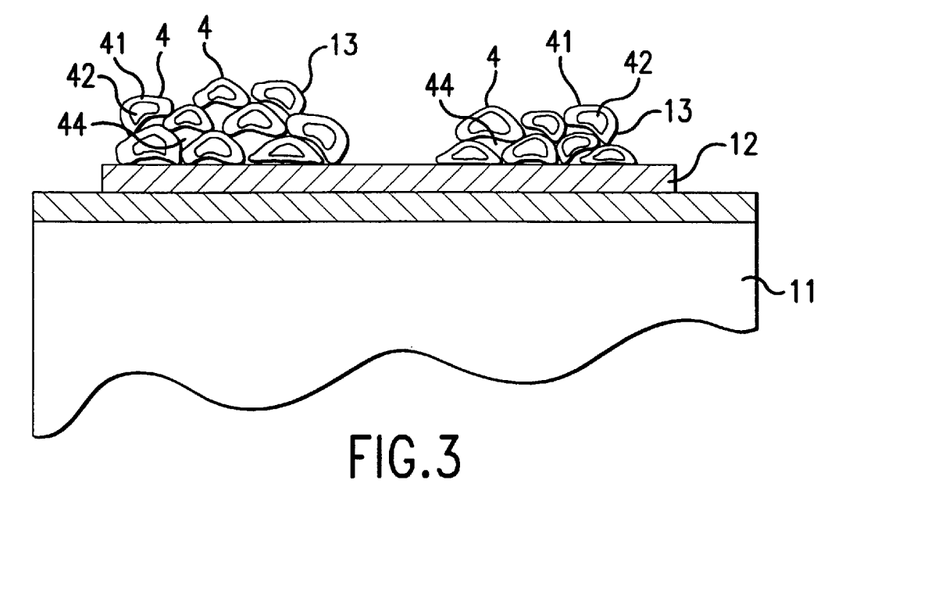
FIG. 3 illustrates an example of the structure of a heater element.

FIG. 3 details a simplified possible structure of pipe 11 which is coated with an isolating layer 12.

The heating element 13, illustrated as windings deposited on isolating layer 12, comprises a plurality of small particles 4, which have a generally flattened, or splashed shape. Particles 4 may have dimensions in the range of about 40 to 90 micrometer.

Each particle 4 includes an outer coating 41 made of oxides, mainly of boron but also including oxides of the other elements in the alloy (for example silicon oxide), and an inner part 42, mainly made of metallic alloy. There may be gaps 44 between adjacent particles 4.

The particles reach the pipe 11 when at least the surface of particles is in a liquid state, then they splash on the solid surface, adhere to each other and/or the insulating substrate and become solid. This may help explain the generally flattened shape of the particles deposited on the target surface.

Since the oxide layer 41 is an electrical isolator, electrical current may pass through the points where globules attach to each other so that direct contact between their inner parts 42 is achieved. Thus, the whole structure includes many tiny bridges for electrical current.

There are many applications of the above detailed heater. One is water heating, to supply hot water for domestic use for example. A short segment of pipe with heater attached thereto is inserted, to achieve the desired effect.

Another use is for room heating. Here, a heated pipe is used in combination with a radiator and a water pump. The water pump is optional, since hot water may achieve circulation because of the difference in specific density relative to cold water. Using a pump, however, may increase the heat throughput especially when a small radiator is used, and there is an advantage that smaller temperature differences are created in the system.

Various embodiments of the present invention may be implemented in devices for heating of solids, liquids or gases.

Figure 4:
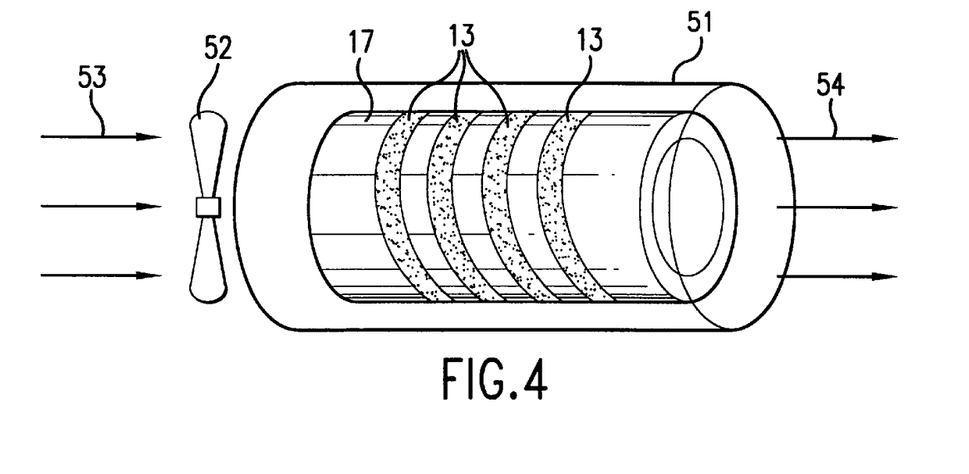
FIG. 4 illustrates an example of the structure of a blower using a tubular heater element.

As an example of one embodiment of the invention, FIG. 4 illustrates an example of the structure of a blower using a tubular heater element. The heater element includes an insulated pipe 17, with heating element 13, made as windings deposited on insulating pipe 17.

The insulated pipe 17 may be either a metallic pipe with insulator deposited thereon, or a pipe made of an isolating material like ceramics.

The device also includes an outer, protective tube 51. Tube 51 may serve both to direct the hot air in a direction as desired, and as protective cover to prevent people from touching the hot heating element. A fan 52 provides a forced air flow, to cool the heater element and to transfer heat energy to a large volume of air. This achieves a low thermal resistance between heater and the ancient air, even for a small heater element. Fan 52 may be operated using an electric motor (not shown). Thus, cold air 53 flowing into the blower is heated and exits as hot air 54 on the other side of the blower.

Figure 5:
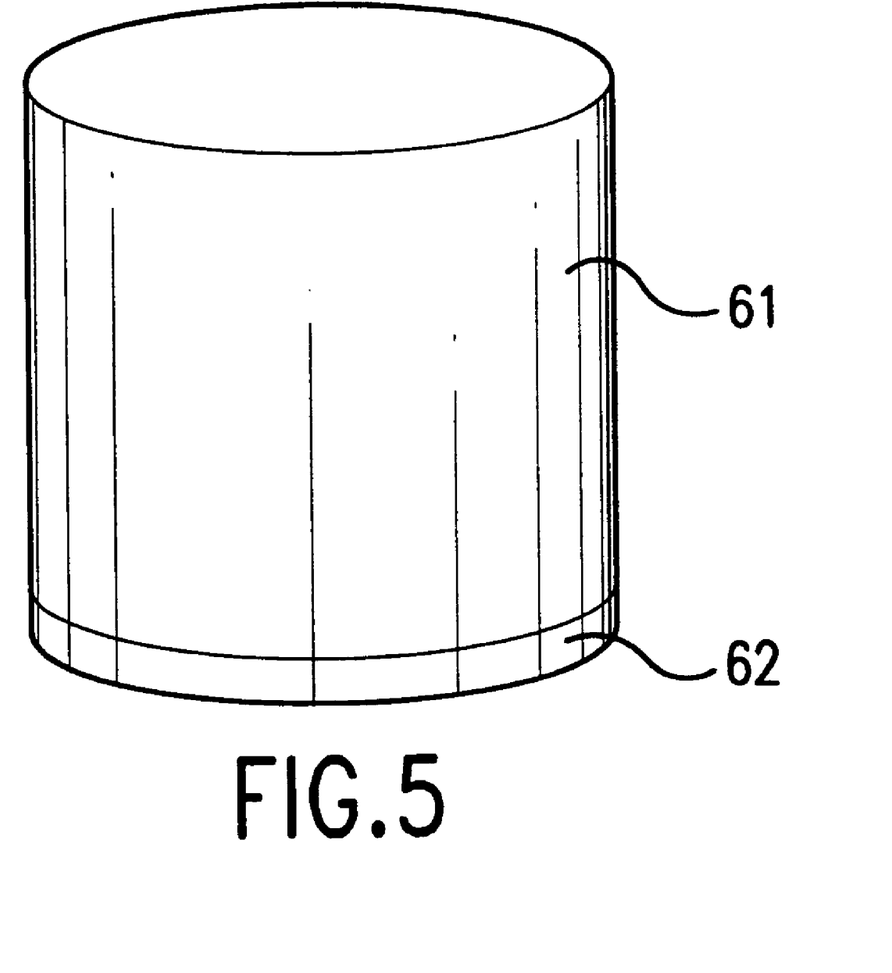
FIG. 5 illustrates an example of the structure of a heated pot blower using a planar heater.

FIG. 5 illustrates an example of the structure of a heated pot using a planar heater.

Pot 61 includes a heated bottom 62, including a (not shown) heater element deposited on a insulating layer. For a metallic pot, a layer of alumina may be deposited on the outside surface of the pot's bottom. Alumina may be deposited using a plasma or flame spray, as detailed above. The heater element is then applied using a plasma spray. For a planar surface, uniform layers may be applied by moving the pot or the spray nozzle sideways, as detailed above. In another embodiment of the method, it may be possible to rotate the pot instead of, or in addition to, the linear movements.

The heater element (not shown) may have various shapes, for example linear, circular, spiral or meander-like form.

Preferably, an additional, external isolating layer should be applied to cover the heater element (to provide electrical isolation) and also to provide thermal isolation. Thus, all or most of the heat generated will be transferred to the pot. Good thermal isolation also allows to place the pot on a table or other surface which need not withstand high temperatures, since the bottom of the pot will not be too hot.

An advantage of this embodiment is that there is no heating element inside the pot. The pot may be filled with whatever food, the food mixed and otherwise handled as needed. The heater has very good thermal contact with the pot, to achieve good heat transfer.

A very thin heater is achieved, adding an insignificant height to the pot. The only visible addition may be the outer isolator layer.

The mechanical connection between heater and pot is also very good, with no adhesives or mechanical components.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for the production of a heater element on a metallic target area, comprising:

preparing a plurality of particles having a specified size range, the plurality of particles comprising a metallic amorphous alloy, the metallic amorphous alloy comprising boron, applying the particles to the target area using at least one of a plasma spray process and a flame spray process, and applying a layer of electrically insulating material on the target area prior to applying the particles to the target area, the layer of electrically insulating material having a thickness which permits transfer of thermal energy between the particles and the target area.

2. The method of claim 1, wherein the particles comprise about 1 to 10 weight % boron.

3. The method of claim 1, wherein the particles comprise about 2 to 3 weight % boron.

4. The method of claim 1, wherein the step of applying the particles to the target area comprises spraying liquid particles toward the target area, and further comprising providing oxygen for enabling formation of oxides on the liquid particles.

5. The method of claim 1, wherein the target area comprises an insulating material.

6. The method of claim 1, 5, wherein the metallic alloy comprises FeCrB.

7. The method of claim 1, 5, wherein the metallic alloy comprises FeBSiCuNb.

8. The method of claim 1, 5, wherein the particles have a size between about 5 and 150 microns.

9. The method of claim 1, 5, wherein the particles have a size between about 60 and 90 micrometers.

10. The method of claim 1, 5, wherein the particles have a size which results in liquid globules having diameters in a range between about 5 and 300 microns.

11. The method of claim 1, wherein the insulating material comprises enamel.

12. The method of claim 1, wherein the insulating material comprises alumina.

13. The method of claim 12, comprising:

applying a layer of alumina using at least one of a plasma spray process and a flame spray process.

14. The method of claim 1, wherein the target area comprises a metallic material, and further comprising:

removing dirt and undesired material from the target area, applying a layer of metal using at least one of a plasma spray process and a flame spray process, the layer of metal having a thickness between about 1 and 10 microns, and applying a layer of insulating material on the target area prior to applying the particles to the target area.

15. A method for the production of a heater element on a target area, comprising:

preparing a plurality of particles having a specified size range, the plurality of particles comprising a metallic alloy the metallic alloy comprising boron, and applying the particles to the target area using at least one of a plasma spray process and a flame spray process, wherein the metallic alloy comprises:
about 0.03 weight % C,
about 1.52 weight % N,
about 5.12 weight % Si,
about 3.08 weight % B,
about 90.22 weight % Fe,
about 0.015 weight % P, and
about 0.015 weight % S.

16. A method for the production of a heater element on a target area, comprising:
preparing a plurality of particles having a specified size range, the plurality of particles comprising a metallic alloy, the metallic alloy comprising boron, and
applying the particles to the target area using at least one of a plasma spray process and a flame spray process, wherein the metallic alloy comprises:
about 5.6 weight % Nb,
about 7.7 weight % Si,
about 84.1 weight % Fe,
about 1.3 weight % B, and
about 1.3 weight % Cu.

17. A method for the production of a heater element on a target area, comprising:
preparing a plurality of particles having a specified size range, the plurality of particles comprising a metallic alloy, the metallic alloy comprising boron, and
applying the particles to the target area using at least one of a plasma spray process and a flame spray process, wherein the metallic alloy comprises:
about 16.0 weight % Cr,
about 4.2 weight % Si,
about 1.13 weight % Ni,
about 2.3 weight % B,
about 75.8 weight % Fe,
about 0.034 weight % C,
about 0.017 weight % S, and
about 0.017 weight % P.

18. A method for the production of a heater element on a target area, comprising:
preparing a plurality of particles having a specified size range, the plurality of particles comprising a metallic alloy, the metallic alloy comprising boron, and
applying the particles to the target area using at least one of a plasma spray process and a flame spray process, wherein the metallic alloy comprises:
about 10 weight % Cr,
about 4.2 weight % Si,
about 1.13 weight % N,
about 2.3 weight % B,
about 81.8 weight % Fe,
about 0.034 weight % C,
about 0.017 weight % S, and
about 0.017 weight % P.

19. A method for the production of a heater element on a target area, comprising:
preparing a plurality of particles having a specified size range, the plurality of particles comprising a metallic alloy, the metallic alloy comprising boron, and
applying the particles to the target area using at least one of a plasma spray process and a flame spray process, wherein the metallic alloy comprises:
about 79 weight % Fe,
about 16 weight % Cr,
about 3.3 weight % B,
less than about 0.1 weight % Sn, and
less than about 0.1 weight % Pb.

20. A method for the production of an abrasive surface on a target area, comprising:
preparing a plurality of particles having a specified size range, the plurality of particles comprising a metallic amorphous alloy, the metallic amorphous alloy comprising boron, and
applying the particles to the target area using at least one of a plasma spray process and a flame spray process.

21. The method of claim 20, wherein the particles comprise about 1 to 10 weight % boron.

22. The method of claim 20, wherein the particles comprise about 2 to 3 weight % boron.

23. The method of claim 20, wherein the step of applying the particles to the target area comprises spraying liquid particles toward the target area, and further comprising
providing oxygen for enabling formation of oxides on the liquid particles.

24. A heater element comprising an electrically resistive layer fabricated by the deposition of boron-containing amorphous particles on an insulating surface using at least one of a plasma spray method and a flame spray method.

25. The heater element of claim 24, wherein the insulating surface comprises ceramic.

26. The heater element of claim 24, wherein the insulating surface comprises an enamel layer deposited on an electrically conductive surface.

27. The heater element of claim 24, wherein the insulating surface comprises an alumina layer deposited on an electrically conductive surface.

28. The heater element of claim 24, wherein the particles comprise about 1 to 10 weight % boron.

29. The heater element of claim 24, wherein the particles comprise about 2 to 3 weight % boron.

* * * * *